(12) United States Patent
Janz et al.

(10) Patent No.: US 9,039,095 B2
(45) Date of Patent: May 26, 2015

(54) CUSHION ELEMENT WITH DIFFERENT HARDNESS ZONES FOR MOTOR VEHICLES

(75) Inventors: Michael Janz, Huellhorst (DE); Andreas Weingaertner, Stemwede (DE); Werner Klusmeier, Luebbecke (DE)

(73) Assignee: Johnson Controls Technology Company, Holland, MI (US)

( * ) Notice: Subject to any disclaimer, the term of this patent is extended or adjusted under 35 U.S.C. 154(b) by 888 days.

(21) Appl. No.: 13/055,575

(22) PCT Filed: Jul. 30, 2009

(86) PCT No.: PCT/EP2009/005530
§ 371 (c)(1),
(2), (4) Date: Apr. 19, 2011

(87) PCT Pub. No.: WO2010/012469
PCT Pub. Date: Feb. 4, 2010

(65) Prior Publication Data
US 2011/0187173 A1 Aug. 4, 2011

(30) Foreign Application Priority Data
Jul. 31, 2008 (DE) .......................... 10 2008 035 611

(51) Int. Cl.
*B60N 2/70* (2006.01)
*A47C 27/12* (2006.01)

(52) U.S. Cl.
CPC ........... *B60N 2/70* (2013.01); *Y10T 428/24942* (2015.01); *A47C 27/121* (2013.01); *B60N 2/7017* (2013.01)

(58) Field of Classification Search
CPC ..... B60N 2/7017; A47C 27/121; A47C 27/22
USPC ............ 297/452.26–452.28, 452.32, 452.35, 297/452.37, 452.55, 452.57, 452.61, 452.62
See application file for complete search history.

(56) References Cited

U.S. PATENT DOCUMENTS

| 3,000,020 | A | * | 9/1961 | Lombard et al. ................... 5/653 |
| 3,574,873 | A | * | 4/1971 | Weinstein ...................... 5/655.5 |
| 3,612,607 | A | * | 10/1971 | Lohr ........................ 297/452.27 |
| 3,616,171 | A | * | 10/1971 | Hoskinson, Sr. ............ 428/300.7 |
| 3,716,875 | A | * | 2/1973 | Fehr ............................... 5/655.7 |
| 3,918,863 | A | * | 11/1975 | Rhodes, Jr. .................... 425/117 |

(Continued)

FOREIGN PATENT DOCUMENTS

| DE | 196 28 698 C1 | 10/1997 |
| DE | 69405487 T2 | 4/1998 |

(Continued)

OTHER PUBLICATIONS

German Search Report mailed Nov. 14, 2012.
(Continued)

*Primary Examiner* — Peter Brown
(74) *Attorney, Agent, or Firm* — Fletcher Yoder, P.C.

(57) ABSTRACT

A cushion element for a vehicle seat or headrest comprises a non-woven layer and a fiber composite material. An insert material is arranged between the non-woven layer and the fiber composite material, and has different compression properties than the fiber composite material. The fiber composite material forms together with the insert material and the non-woven layer a one-piece material composite.

17 Claims, 2 Drawing Sheets

(56) References Cited

U.S. PATENT DOCUMENTS

| | | | |
|---|---|---|---|
| 4,064,578 A * | 12/1977 | Yamada | 297/452.27 |
| 4,755,411 A * | 7/1988 | Wing et al. | 428/71 |
| 4,960,304 A * | 10/1990 | Frantz | 297/284.6 |
| 5,388,891 A * | 2/1995 | Oka et al. | 297/452.48 |
| 5,439,270 A * | 8/1995 | Owen | 297/452.27 |
| 5,460,873 A * | 10/1995 | Ogawa et al. | 428/316.6 |
| 5,543,213 A * | 8/1996 | Duvenkamp | 442/184 |
| 5,544,942 A * | 8/1996 | Vu Khac et al. | 297/452.37 |
| 5,858,159 A * | 1/1999 | Holbrook et al. | 156/256 |
| 5,902,014 A | 5/1999 | Dinkel et al. | |
| 5,942,175 A | 8/1999 | Curran et al. | |
| 6,158,815 A * | 12/2000 | Sugie et al. | 297/452.61 |
| 6,247,751 B1 * | 6/2001 | Faust et al. | 297/180.13 |
| 6,345,865 B1 * | 2/2002 | Ashida et al. | 297/195.1 |
| 6,481,801 B1 * | 11/2002 | Schmale | 297/452.27 |
| 6,626,488 B2 * | 9/2003 | Pfahler | 297/180.11 |
| 6,652,034 B1 * | 11/2003 | Schramm et al. | 297/452.35 |
| 6,687,934 B1 * | 2/2004 | Liao | 5/654 |
| 6,755,475 B1 * | 6/2004 | Tiesler et al. | 297/452.26 |
| 6,817,675 B2 * | 11/2004 | Buss et al. | 297/452.6 |
| 7,108,319 B2 * | 9/2006 | Hartwich et al. | 297/180.1 |
| 7,585,030 B2 * | 9/2009 | Galbreath et al. | 297/452.27 |
| 7,735,169 B2 * | 6/2010 | Wassilefsky | 5/636 |
| 8,282,164 B2 * | 10/2012 | Galbreath et al. | 297/217.3 |
| 2007/0241604 A1 * | 10/2007 | Saitou et al. | 297/452.26 |
| 2008/0157575 A1 * | 7/2008 | Janz | 297/218.1 |

FOREIGN PATENT DOCUMENTS

| | | |
|---|---|---|
| DE | 197 19 532 A1 | 11/1998 |
| DE | 69504987 T2 | 3/1999 |
| DE | 1086852 A1 | 3/2001 |
| EP | 1 806 258 A1 | 11/2007 |
| FR | 2 882 308 A1 | 8/2006 |
| JP | 04-045917 | 2/1992 |
| JP | 09-201250 | 8/1997 |
| JP | 2000-004975 | 1/2000 |
| JP | 2006-223707 | 8/2006 |
| WO | 9602693 A1 | 2/1996 |
| WO | 2004095986 A1 | 11/2004 |
| WO | 2006105874 A1 | 10/2006 |

OTHER PUBLICATIONS

China Office Action mailed May 21, 2013.
Chinese Office Action dated Sep. 13, 2012.
German Examination Report, Jan. 27, 2009. pp. 1-3.
International Search Report & Written Opinion for application No. PCT/EP2009/005530 mailed Mar. 23, 2010.
International Search Report for application No. PCT/EP2009/005530 mailed Mar. 23, 2010.
Japanese Examination Report dated Jul. 30, 2013.
Chinese Office Action Dec. 3, 2013.

* cited by examiner

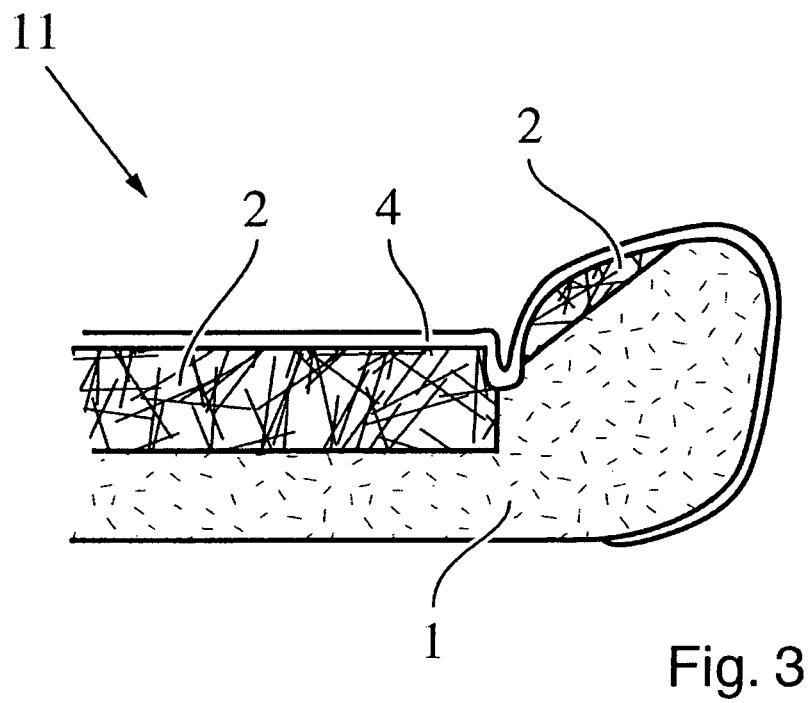
Fig. 3
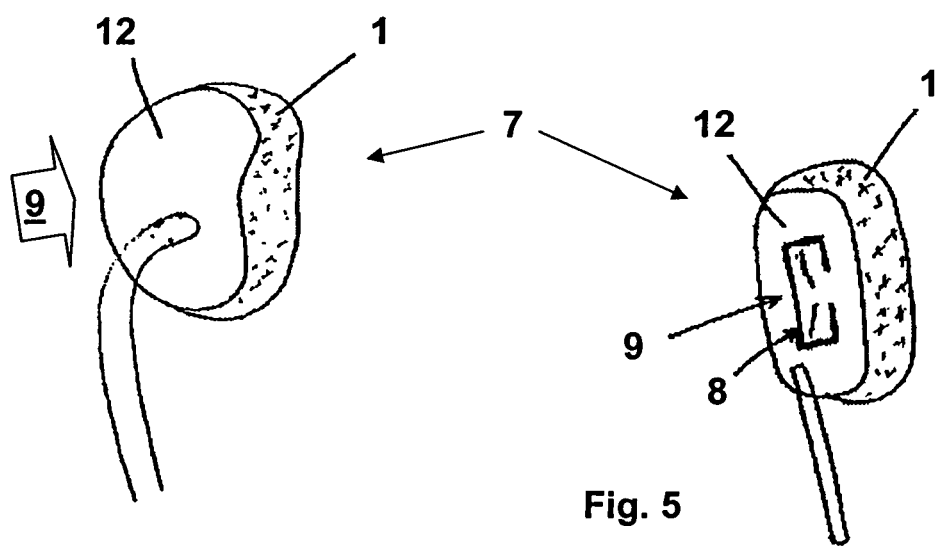
Fig. 4
Fig. 5

CUSHION ELEMENT WITH DIFFERENT HARDNESS ZONES FOR MOTOR VEHICLES

CROSS REFERENCE TO RELATED APPLICATIONS

This application claims priority from and the benefit of PCT Application No. PCT/EP2009/005530, filed on Jul. 30, 2009 and German Patent DE 10 2008 035 611.5, filed on Jul. 31, 2008; all entitled "Cushion Element, in Particular a Seat Cushion Element or a Headrest Cushion Element of Different Hardness Zones for Use in a Motor Vehicle, Method for Producing a Cushion Element and Vehicle Seat and/or Headrest", which are herein incorporated by reference.

BACKGROUND

The invention relates to a cushion element, in particular a seat cushion element or a headrest cushion element and/or a headrest for use in a motor vehicle, as well as a method for producing a cushion element and a headrest and/or a vehicle seat, in particular for a motor vehicle comprising a seat part and a backrest part comprising padding which covers the supporting structure made of metal or plastics and which serves for increasing the seating comfort.

In the field of producing cushion elements, in particular for motor vehicle seats, it is known that a large proportion of the backrests and/or seat surfaces of vehicle seats is increasingly produced from foamed parts, such as for example, from flexible polyurethane foam, and is subsequently covered with covers made of leather, textiles or the like. It is further known that a smaller proportion of the seat and backrest cushions, in particular in the automobile industry, is produced from latexed coir fibers. The reason for this application is that fibers in cushion covers have an improved microclimate, are better ventilated and thus provide improved comfort. In a known production method of cushion covers made of fiber composite materials, a vacuum and/or a low pressure is applied to a punching die in which an air-permeable non-woven fabric is located. Fibers with binding agents (for example latex) are scattered into this die. Subsequently, the cushion covers are dried in the die. In the following operating steps, the cushion cover is stamped, vulcanized and polished. In some fields of application, therefore, the very rigid and stiff cushion parts are produced from a fiber composite (such as for example comprising coir fibers and latex) which partially serves as an assembly support in order to receive and fasten fans, massage units and other components. This is only possible in the flexible foam by the use of additional reinforcing units/components.

During the production of such fiber composites, it is known that slightly different hardnesses may be present in the cushions, by different quantities of fibers being introduced into the die, whereby slight differences in hardness are able to be achieved, see for example the publication DE 695 04 987 T2.

However, for achieving greater differences in hardness, such as for example for achieving very soft seating behavior for improving the comfort, it is necessary for the fiber composite material/the cushion part to be covered with very flexible cut foam. This is a very costly and cost-intensive method as it generally has to be carried out by hand.

During the production of headrests it is known that a strengthening contouring part may be produced from an injection-molded element. These injection-molded elements may additionally comprise the headrest rod mechanism and/or be connected thereto.

It is, therefore, the object of the invention to provide a cushion element and a method for the production thereof which avoids the cited drawbacks and, in particular, improves the economics of producing horizontal and vertical hardness settings of the fiber composite material.

SUMMARY

This object is achieved according to the invention by a cushion element, in particular a seat cushion element or a headrest cushion element for use in a motor vehicle, the cushion element comprising a non-woven layer and a fiber composite material, an insert material being arranged between the non-woven layer and the fiber composite material, the insert material having different compression properties relative to the fiber composite material, and the fiber composite material forming together with the insert material and the non-woven layer a one-piece material composite. According to the invention, by incorporating the introduction of very open non-woven fabrics or technically produced textiles into the production process for producing fiber composites, actively or passively ventilated cushion covers may be produced substantially more cost-effectively than by conventional bonding. The insert material is introduced into a shaping die, after the non-woven layer has been positioned in the shaping die. Additionally, the initial material for the fiber composite material is introduced into the shaping die. The subsequent shaping process leads to the formation of a one-piece material composite between the non-woven layer, the insert material and the fiber composite material. As a result, (in particular with regard to their geometric dimensions) highly accurate shaping processes of the initial materials may be reduced to a minimum and thus the production costs reduced. The stable base body, comprising scattered composite fibers, (i.e. of the fiber reinforced material) is maintained after completion of the shaping process, so that the contour of the cushion part is faithfully maintained, which is imperative when covering with textiles, leather or film. According to the invention, it is thus possible in an advantageous manner that by the use of the insert material and by the scattered introduction of the initial material of the fiber composite material, the capacity for air-conditioning, different hardness regions and the air supply may be simultaneously integrated in one process step during production. Moreover, as a result, the possibility is also advantageously provided to recycle (to reuse) such a cushion element cost-effectively, namely as no additional bonding agent has to be used (in particular with regard to its chemical nature relative to the binding agent used during the production of the fiber composite).

According to the invention, it is further preferred that the insert material is a non-woven material or a pad, the non-woven fabric material or the pad comprising natural or synthetic fibers. As a result, a wide variety of different materials may be used for producing different comfort requirements and/or different applications by means of the method according to the invention, for example PES/PET (polyethylene terephthalate) fibers.

It is further preferred according to the invention that the insert material is provided to extend only over a partial region of the surface of the cushion element and/or that at least two different insert materials are provided, a first insert material and a second insert material being arranged in different surface regions of the cushion element. According to the invention, as a result, it is possible in an advantageous manner that in the cushion element not all surface zones are covered by the insert material and/or that different surface zones may be produced, so that the user comfort may be further increased at very low additional cost.

It is further preferred according to the invention if the insert material is more flexible than the fiber composite material. As a result, particularly soft seating behavior of the cushion body according to the invention may be implemented in a simple manner.

According to the invention, it is also preferred that the fiber composite material comprises fibers and a binding agent, the binding agent, in particular, being latex, and the fibers, in particular, being coir fibers. As a result, it is possible in a particularly advantageous manner that the cushion part according to the invention is particularly well-suited for very efficient active and passive ventilation. According to the invention, the use of different resilient binding agents—in particular the use of different types of latex—in this case advantageously permits differences in hardness to be able to be achieved in the cushion part and/or in the cushion element.

According to the invention, it is also preferred that the insert material is a technically produced woven fabric or spun non-woven fabric. As a result, according to the invention the cushion element may be advantageously produced in a particularly variable and cost-effective manner.

Further, it is preferred according to the invention that the insert material has a lower specific weight than the fiber composite material. As a result, a particularly lightweight cushion element may be produced in a particularly simple and cost-effective manner.

A further subject of the present invention relates to a method for producing a cushion element, in particular according to the invention, in which a precursor material comprising an insert material is shaped in a shaping die, initially the non-woven layer being introduced into the shaping die for producing the precursor material, and subsequently the insert material and fibers and binding agent being introduced into the shaping die for producing the fiber composite material. As a result, according to the invention it is possible in an advantageous manner to produce the cushion element particularly cost-effectively.

According to the invention, it is further preferred that the fibers are combined with the binding agent and that the binding agent of the fiber composite material fixes the insert material and the non-woven layer after a curing step and/or that the binding agent is a latex material and that after shaping the cushion element in the shaping die a vulcanization step is carried out. As an alternative to carrying out a vulcanization step, this vulcanization step may also be dispensed with, if a binding agent consisting of a polyurethane dispersion or a chloroprene-latex dispersion is used.

A further subject of the present invention relates to a headrest, in particular for a motor vehicle, the headrest comprising a cushion element according to the invention.

A further subject of the present invention relates to a vehicle seat, in particular for a motor vehicle, comprising a seat part and a backrest part, the seat part and/or the backrest part comprising a cushion element according to the invention.

DRAWINGS

Embodiments of the invention are shown in the drawings and described in more detail in the following description.

FIGS. 2 and 3 show schematically in each case an embodiment of a cushion element of a vehicle seat according to the invention, in particular either the seat part or the backrest part, in a schematic sectional view, in FIG. 2 the user side being shown at the bottom and in FIG. 3 the user side being shown at the top.

FIGS. 4 and 5 show schematically in each case an embodiment of a headrest comprising a cushion element according to the invention.

DETAILED DESCRIPTION

Figure 1:
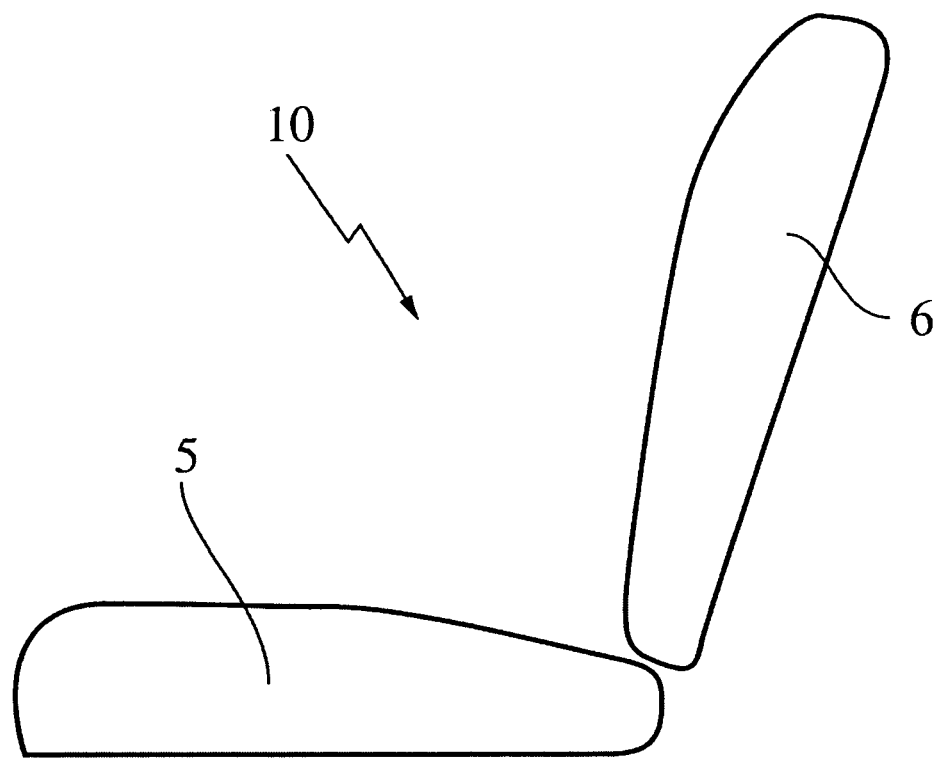
FIG. 1 shows schematically a vehicle seat comprising a seat part and a backrest part in side view.

FIG. 1 shows schematically a generic vehicle seat 10 in a side view. The vehicle seat 10 comprises a seat part 5 and a backrest part 6 comprising in each case padding and/or a cushion element 11 covering the supporting structure of the seat or backrest part, said supporting structure being made of metal or plastics and said padding and/or cushion element serving for improving the seating comfort.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

Figure 2:
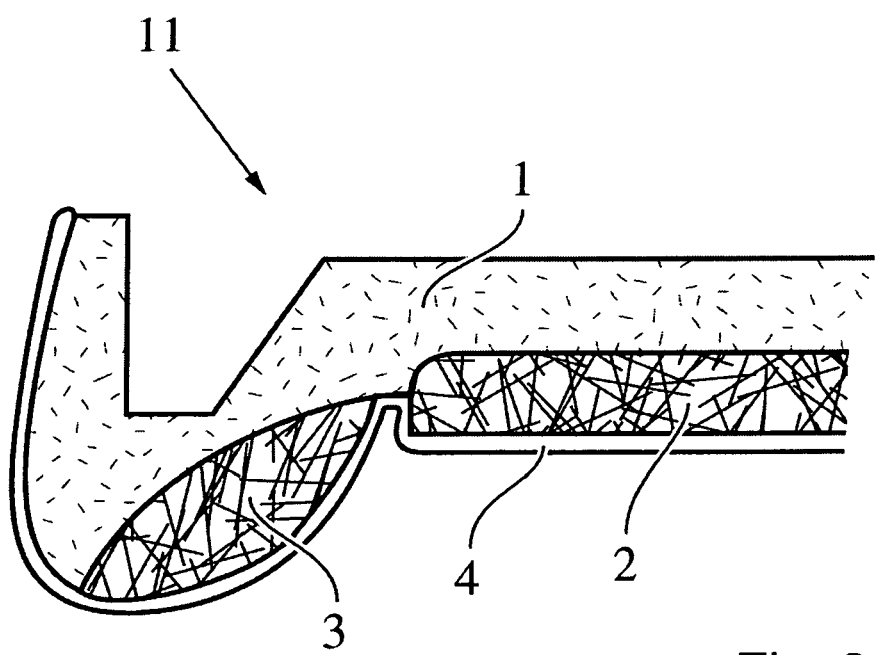

FIGS. 2 and 3 show schematically in each case an embodiment of a cushion element 11 of a vehicle seat 1 according to the invention for the seat and/or the backrest 5, 6 in a sectional view. The cushion element 11 has a fiber composite material 1 as well as a non-woven layer 4. On the side of the non-woven layer 4 facing the fiber composite material 1, an insert material 2, 3 is arranged in the cushion element 11 according to the invention.

In FIGS. 4 and 5 in each case an embodiment of a headrest 7 comprising a cushion element according to the invention and a shaped body 12 are shown. Such a headrest 7 preferably comprises a fiber composite material 1 and further different hardness regions which are capable of being air-conditioned (i.e. capable of being ventilated) and which are produced by insert materials of variable softness. The fiber composite material comprises fibers consisting of a base fiber with a strength determining the contour. In the headrest 7, hardness regions may be adjusted in the production process by inserts having very different properties. The passage of air to the air-conditioning part may be achieved by an arrangement of tubes in individual cavities, by a separate fan 8 (or a plurality of separate fans 8) in the composite structure or the cavity thereof or even by central fans. The fans 8 produce an air flow 9 for air-conditioning the headrest 7 and/or generally the cushion element.

For producing a cushion element 11 it is provided that fibers 10 are provided with a binding agent—in particular latex—and scattered directly by means of a distribution head into preform-receivers and/or into dies. Polyurethane/a polyurethane-dispersion is considered as an alternative binding agent—instead of latex.

The cushion cover according to the invention and/or the cushion element 11 according to the invention consisting of the fiber composite material 1 with the insert material 2, 3 has the advantage that different hardness regions—in particular in the comfort zones—are produced by the fiber inserts 2, 3 of variable flexibility and/or the insert material 2, 3. The base body 1 and/or the fiber composite material 1 comprise in this case, in particular, a base fiber having a strength determining the contour and a binding agent. In the cover and/or in the insert material 2, 3 it is possible for different hardness regions of the material to be produced both in a direction substantially perpendicular to the subsequent surface of the cushion element 11 and in a direction substantially parallel to the subsequent surface of the cushion element 11. The first of these possibilities (i.e. variable hardnesses with penetration depths of different degrees into the cushion element 11 perpendicular to the surface thereof) is subsequently denoted as different "horizontal" hardness regions and combined with the insert material denoted by the reference numeral 2. The second of these possibilities (i.e. variable hardnesses at different points of the cushion element 11) is subsequently denoted as different "vertical" hardness regions and combined with the insert material denoted by the reference numeral 3. The insert materials 2, 3 have, in particular, different properties which may be adjusted, whereby very different configurations of the cushion element 11 may be produced. An economical production of the fiber composite material for cushions is achieved according to the invention by a large proportion of the fibers being scattered with a binding agent (bonding agent such as latex) by means of a distribution head guided by a robot into a die, and the hardness regions are positioned in the die, by means of a natural-based or synthetic-based fiber non-woven fabric, at the points where comfort is required from different degrees of hardness. An almost seamless transition from the synthetic-based or natural-based base fibers is achieved by the inserts used being treated during the process with the same resilient binding agent as the fibers in the base body.

The physical properties and level of comfort of the insert and the positioning thereof in the die influence the hardness and level of comfort of the cushion part.

The invention relates to a cushion part comprising, for example, synthetic fibers (PES, PET) and/or natural fibers (for example coir fibers) bonded with flexible, thermosetting plastic binders and/or binding agents (for example latex) or the like, in particular for use as a cover for backrests, seat surfaces or the like, of vehicle seats with a region consisting of synthetic or natural fibers and inserts providing the contour, with substantially different, for example more flexible, properties than the base fiber.

According to the invention, during the production process of the cushion element made of fiber composite materials, flexible synthetic non-woven inserts, non-wovens or mats, i.e. the insert material 2, 3, made of flexible natural fibers, are inserted during the process into the cavity of the die.

The stable base body 1, comprising scattered composite fibers, of the cushion element 11 (in particular made of fiber composite material 1) is maintained, so that the contour of the cushion part is also faithfully maintained which is imperative when covering with textiles, leather or film.

LIST OF REFERENCE SYMBOLS

1 Fiber composite material
2,3 Insert material
4 Non-woven layer
5 Seat part
6 Backrest part
7 Headrest
8 Fan
9 Air flow
10 Vehicle seat
11 Cushion element
12 Shaped body

The invention claimed is:

1. A cushion element comprising a non-woven layer and a fiber composite material, wherein an insert material is arranged between the non-woven layer and the fiber composite material, the insert material having different compression properties relative to the fiber composite material, and the fiber composite material forming together with the insert material and the non-woven layer a one-piece material composite, and wherein a binding agent of the fiber composite material fixes the insert material and the non-woven layer via a curing process.

2. The cushion element as claimed in claim 1, wherein the insert material is a non-woven material or a pad.

3. The cushion element as claimed in claim 2, wherein the non-woven material or pad comprises natural fibers.

4. The cushion element as claimed in claim 2, wherein the non-woven material or pad comprises synthetic fibers.

5. The cushion element as claimed in claim 1, wherein the insert material extends only over a partial region of the surface of the cushion element.

6. The cushion element as claimed in claim 1, comprising at least two different insert materials including a first insert material and a second insert material arranged in different surface regions of the cushion element.

7. The cushion element as claimed in claim 1, wherein the insert material is more flexible than the fiber composite material.

8. The cushion element as claimed in claim 1, wherein the fiber composite material comprises fibers and the binding agent.

9. The cushion element as claimed in claim 1, wherein the insert material comprises a woven fabric or a spun non-woven fabric.

10. The cushion element as claimed in claim 1, wherein the insert material has a lower specific weight than the fiber composite material.

11. A headrest for a motor vehicle, comprising a cushion element as claimed in claim 1.

12. A vehicle seat for a motor vehicle, comprising a seat part and a backrest part, wherein the seat part and/or the backrest part comprises a cushion element as claimed in claim 1.

13. The cushion element as claimed in claim 1, wherein the cushion element is configured to form a vehicle seat cushion element.

14. The cushion element as claimed in claim 1, wherein the cushion element is configured to form a vehicle headrest cushion element.

15. The cushion element as claimed in claim 1, wherein the binding agent comprises latex.

16. The cushion element as claimed in claim 15, wherein the fibers comprise coir fibers.

17. A cushion element comprising a non-woven layer and a fiber composite material, wherein a first insert material having a first hardness in a first direction and a second insert material having a second hardness in a second direction are arranged between the non-woven layer and the fiber composite material, the first direction is substantially perpendicular to the second direction, the second hardness is greater than the first hardness, the first and second hardnesses are different than a third hardness of the fiber composite material, and the fiber composite material forms together with the first and second insert materials and the non-woven layer a one-piece material composite, and wherein a binding agent of the fiber composite material fixes the first and second insert materials and the non-woven layer via a curing process;
    wherein the fiber composite material comprises fibers scattered throughout the binding agent via a distribution head guided by a robot.

\* \* \* \* \*